United States Patent [19]

Vallins

[11] 4,262,290

[45] Apr. 14, 1981

[54] DISPLAY SYSTEMS

[75] Inventor: David J. Vallins, Cheltenham, England

[73] Assignee: Smiths Industries Limited, London, England

[21] Appl. No.: 36,705

[22] Filed: May 7, 1979

[30] Foreign Application Priority Data

May 12, 1978 [GB] United Kingdom ............... 19296/78

[51] Int. Cl.[3] ............................................. G06F 3/14

[52] U.S. Cl. .................................... 340/728; 340/705; 340/747; 340/793

[58] Field of Search ............... 340/722, 728, 747, 798, 340/705, 793, 744

[56] References Cited

U.S. PATENT DOCUMENTS

| | | | |
|---|---|---|---|
| 3,541,537 | 11/1970 | Kasson | 340/728 |
| 3,812,491 | 5/1974 | Barraclough et al. | 340/798 |
| 4,119,956 | 10/1978 | Murray | 340/728 |
| 4,122,438 | 10/1978 | Bird | 340/731 |
| 4,127,850 | 11/1978 | Vallins | 340/728 |

*Primary Examiner*—Marshall M. Curtis

*Attorney, Agent, or Firm*—Pollock, Vande Sande and Priddy

[57] ABSTRACT

In a cathode-ray tube display system, signals defining the coordinates of the element of the screen on which the cathode-ray beam is incident in its raster scan are supplied to a comparator together with signals defining the coordinates of a series of points defining the image to be displayed. The comparator derives a brightness-weighting signal in respect of each element in accordance with the proximity of that element to those of the points defining the image within a predetermined proximity. The predetermined proximity may be equal to the separation between the points. The system also includes a store, brightness-weighting signals being added together in the store to produce a total signal for each element that is used to control bright-up of the element. The store may include two units that each receive the brightness-weighting signals in respect of elements in two regions comprising several raster lines each, signals from one region being read out of one unit while signals from the other region are written into the other unit. Alternatively, the store may include a plurality of units associated with respective regions of the screen, the units being written into and associated with a particular region only if brightness-weighting signals indicate the presence of a part at least of the image in that region. The system may also include a delay unit that receives first brightness-weighting signals in respect of odd numbered elements along the raster lines and a processor that interpolates from the first signals second signals in respect of the even numbered elements, the second signals being output intermediate the first signals.

15 Claims, 8 Drawing Figures

DISPLAY SYSTEMS

BACKGROUND OF THE INVENTION

This invention relates to display systems and control systems for display systems.

The invention is particularly concerned with raster-scan display systems, and in this context is especially, though not exclusively, concerned with such systems as used to provide display of symbology in, for example, an aircraft.

In the latter context the invention is applicable to aircraft head-up display systems, that is to say, to systems in which the display of symbols generated on the screen of a cathode-ray tube is projected onto a partially-transparent reflector in the line-of-sight of a pilot or other crew member of the aircraft so as to provide an image of the display against the background of the external scene through the aircraft windscreen. The display symbols conventionally include one or more lines that are required to be maintained horizontal in the external scene viewed through the reflector, irrespective of manoeuvre of the aircraft. To this end the disposition in the display of these one or more 'horizon' lines is varied in tilt, and also in lateral displacement, in accordance with control signals that are indicative of change of aircraft attitude in bank and pitch respectively. Where a raster scan is used, variation of the angle of tilt is usually accompanied by change in the degree of clarity or definition of the line concerned, the loss of definition being in general larger the smaller the angle of inclination from alignment with the line-scan of the raster. A staircase or notched appearance is usually experienced and slight change in the angle of tilt can readily result in disconcerting movement, and even oscillatory back-and-forth break up, of the line representation.

A significant increase in the number of line scans in the raster together with a corresponding increase in the definition with which the display symbology is pictured, would serve to reduce the visual staircase or notched effect. But there is usually in practive a standard raster to be used (for example 512-line), and an economic or space limit on the amount of information storage and processing that can be provided for picture definition. Furthermore, the signals for display of the symbology are conveniently and more economically generated using digital techniques, so the essentially discrete-element composition of the symbol representations adds to the disjointed visual effect. The display representation of each 'horizon' line for example, is in essence generated by bright-up of successive elements across the cathode-ray-tube screen, and whereas these elements for an untilted line are joined up with one another in one series along one or more horizontal scan lines, the tilted-line representation is formed by disjointed series on successive, vertically-spaced scan lines of the raster.

BRIEF SUMMARY OF THE INVENTION

It is one of the objects of the present invention to provide a control system for a display system which may be used to achieve an improved representation, and which may be used more especially to reduce the staircase or notched effect referred to above in displaying symbology.

According to one aspect of the present invention there is provided a control system for selectively controlling bright-up of elements of a display area during raster scanning of said area such as to provide a display representation of an image, said control system being arranged to receive first signals representative of coordinates of a series of points defining said image, said control system being arranged to receive second signals representative of coordinates of said elements during said raster scan, said control system being arranged to derive from the difference between said first and second signals an indication of the proximity of said elements to said points, and said control system including means for controlling the degree of bright-up applied to said elements in accordance with said indication.

The present invention in the above aspect recognizes that for a given raster scan where the display is to be generated by selective bright-up of successive elements of the display area during that scan, much of the undesired staircase or other disconcerting visual effects usually experienced can be obviated, or at least substantially reduced, by controlling the degree to which bright-up is applied.

More particularly, if there is little variation in levels of bright-up between adjacent raster lines so that there is only a gradual variation in bright-up level between successive lines then the stepped or staircase effect can be reduced.

The control system preferably controls the degree of bright-up applied to said elements in accordance with the proximity of said elements to only those of said points within a predetermined proximity.

The control system may be arranged to derive an individual brightness-weighting signal in respect of the proximity of each of said elements to each of said points within said predetermined proximity and said system may be arranged to control the said degree of bright-up applied to any individual one of said elements in accordance with a total of the individual brightness-weighting signals in respect of said individual ones of said elements.

The degree of bright-up applied to said elements may have a linear or non-linear dependency of said proximity.

According to another aspect of the present invention there is provided a method of controlling the degree of bright-up of elements of a display area such as to provide a display representation of an image in said area, comprising the steps of: deriving first signals representative of coordinates of a series of points defining said image; deriving second signals representative of coordinates of said elements; deriving from the difference between said first and second signals an indication of the proximity of said elements to said points; and controlling the degree of bright-up applied to said elements in accordance with said indication.

The present invention can be used to reduce undesirable visual effects in straight line or other symbology and, although the invention is especially applicable to head-up display systems for aircraft, it is also applicable to display systems generally.

A control system for a display system and for use in providing a head-up display in a military aircraft, will now be described, by way of example, with reference to the accompanying drawings.

DETAILED DESCRIPTION

Figure 1:
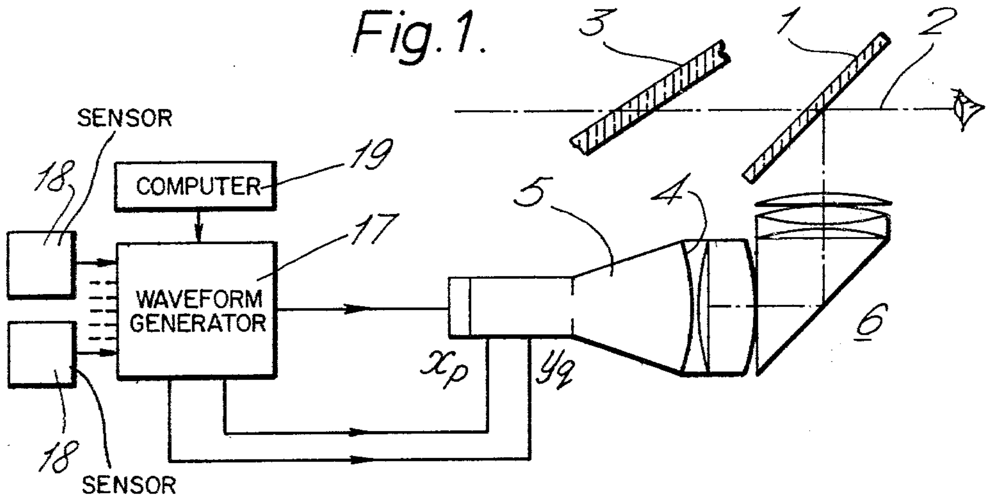
FIG. 1 is a schematic representation of the display system.

Referring to FIG. 1, a partially-transparent reflector 1 is mounted in front of the pilot within the cockpit of the aircraft and in his line-of-sight 2 through the aircraft-windscreen 3. A display of flight and weapon-aiming information is projected on the reflector 1 which is inclined to the line-of-sight 2 so that the pilot sees the display image in the reflector 1 against the background of the external scene through the windscreen 3. The display is projected from the screen 4 of a cathode-ray tube 5 by an optical system 6 that serves to focus the image seen by the pilot, substantially at infinity.

Figure 2:
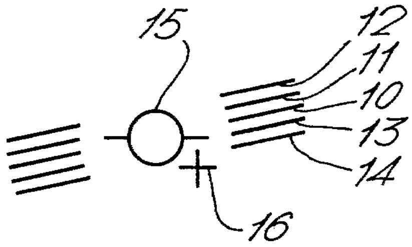
FIG. 2 is illustrative of symbology involved in the display provided by the system of FIG. 1.

The information displayed includes, as illustrated in FIG. 2, analogue presentation of aircraft attitude involving five pitch-bars 10 to 14 (each in the form of two spaced and aligned lines) and a flight-vector symbol 15 (in the form of a circle with short laterally-extending arms). The flight-vector symbol 15 remains stationary in the center of the screen 4 of the cathode-ray tube 5 and so its image remains stationary in the pilot's field of view through the reflector 1. The five pitch-bars 10 to 14 however move so as to be seen by the pilot to be displaced angularly, and also up and down, relative to the symbol 15, in accordance with bank and pitching movements respectively of the aircraft. The bars 10 to 14 remain parallel to one another and their movements on the screen 4 are regulated by reference to the vertical (established for example by a gyroscope or other attitude sensor in the aircraft) in such a way as to maintain them with the middle line 10 indicative of the horizontal (zero pitch-angle) and the other four lines 11 to 14 above and below it at pitch-angle intervals of thirty degrees. The weapon-aiming information on the other hand, and as illustrated in FIG. 2, involves a cross symbol 16 that is moved in the display on the screen 4 so as to be seen by the pilot in image against the external scene through the windscreen 3, and to denote a desired line of aim of the aircraft weapon-system (or a selected part of it).

The electric time-base and video signals required to produce the display of flight and weapon-aiming information on the screen 4, are supplied to the cathode-ray tube 5 by a waveform generator 17. The waveform generator 17 provides a raster time-base and generates the relevant video signals in accordance with signals it receives from appropriate attitude, and other, sensors 18, and a weapon-aiming, or other, computer 19. In this respect it is to be understood that the display generated, and as embodied in the video signals supplied to the cathode-ray tube 5, may embrace a wider variety of information than that involved in the simplified form illustrated in FIG. 2. Any of the information may be presented in digital or analogue form, or both. However, in each case the information is displayed by brightness modulation of the cathode-ray-tube display raster produced by the line and frame time-base signals that are applied to the deflection system of the tube by the waveform generator 17. The video signals required for different parts of the symbology (10 to 16) are derived separately in the waveform generator 17 and are then combined for application to the grid electrode of the cathode-ray tube 5, each signal being derived in accordance with the successive instants in the time-base raster at which bright-up is to occur to achieve a 'paint' of the relevant symbol, or symbol-group, in the appropriate position on the screen.

Figure 3:
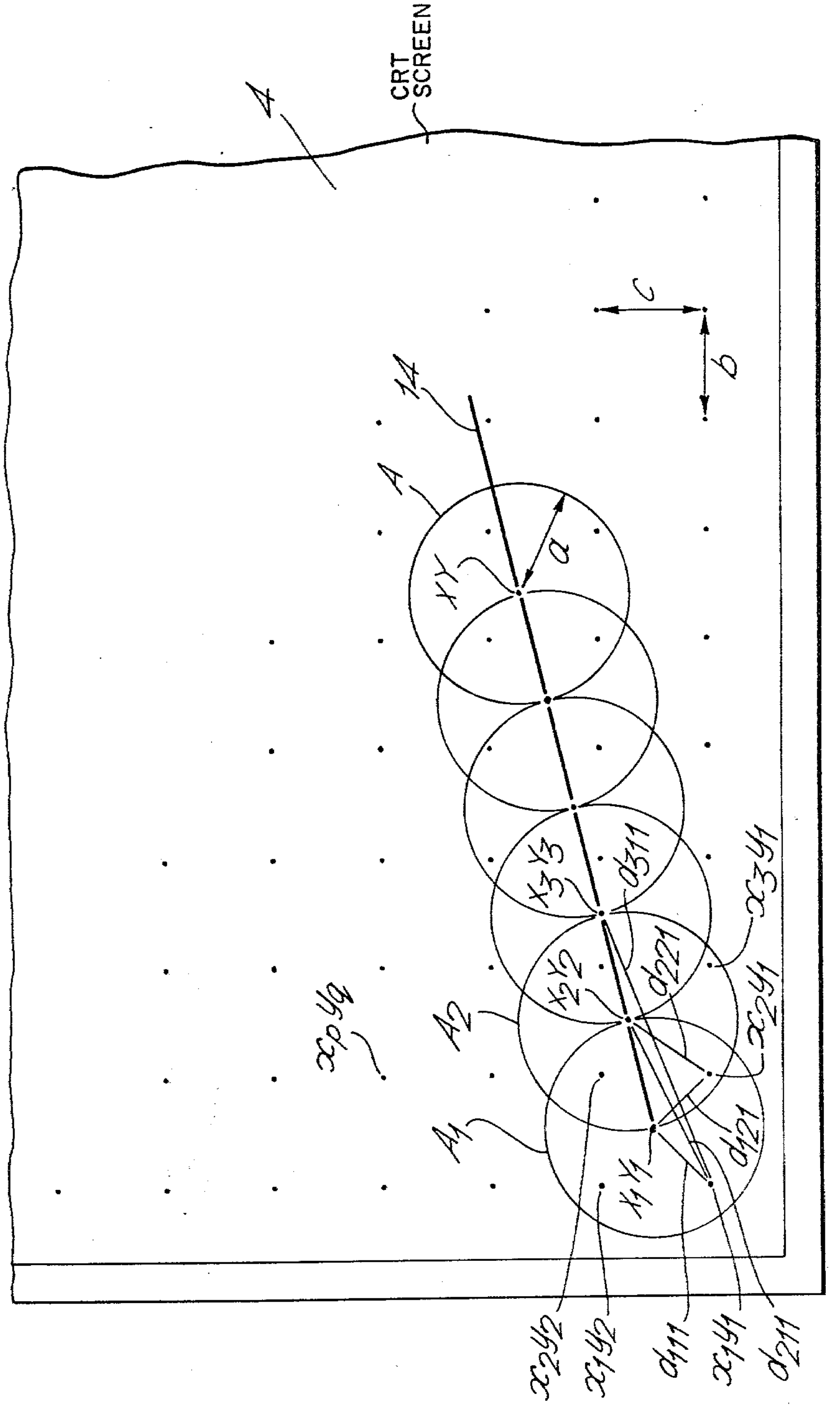
FIG. 3 shows to an enlarged scale a portion of the display area and certain relationships involved in the provision of the display.

Referring to FIG. 3, the display picture on the screen 4 can be regarded as being made up of a matrix of elementary areas defined by a series of successive points $x_p y_q$ separated from one another along the x-axis by a distance b and along the y-axis by a distance c. The cathode-ray beam is scanned through these points in succession, the degree of bright-up applied to each point being controlled in accordance with output signals from the waveform generator 17.

The symbol to be displayed on the screen 4, such as, for example, one of the pitch-bars 14, a part of which is shown to an enlarged scale in FIG. 3, is defined by a series of points XY. Adjacent points XY are separated from each other by a distance a and may be regarded as being surrounded by a circular area A of radius a, such as to encompass several of the points $x_p y_q$. The area $A_1$ around the point $X_1Y_1$, for example, encompasses the points $x_1y_1$, $x_2y_1$, $x_1y_2$ and $x_2y_2$.

The points XY do not, in general, coincide with any of the points $x_p y_q$ of the display picture and it is not therefore possible merely to bright up the display area when the position of the cathode-ray beam in its scan coincides exactly with one of the points XY representing the symbol to be displayed. Instead, each of the points $x_p y_q$ is brighted up to a degree dependent upon its proximity to each of the points XY defining the symbol. More particularly, the points $x_p y_q$ are only brighted up when they fall within one or more of the areas A surrounding each of the points XY, the degree of bright-up being dependent upon their distances from the centers of the areas A. Where a point falls within more than one of the areas A then it receives a degree of bright-up from each area.

The manner in which this is achieved will become apparent from operation of the display system described below.

Figure 4:
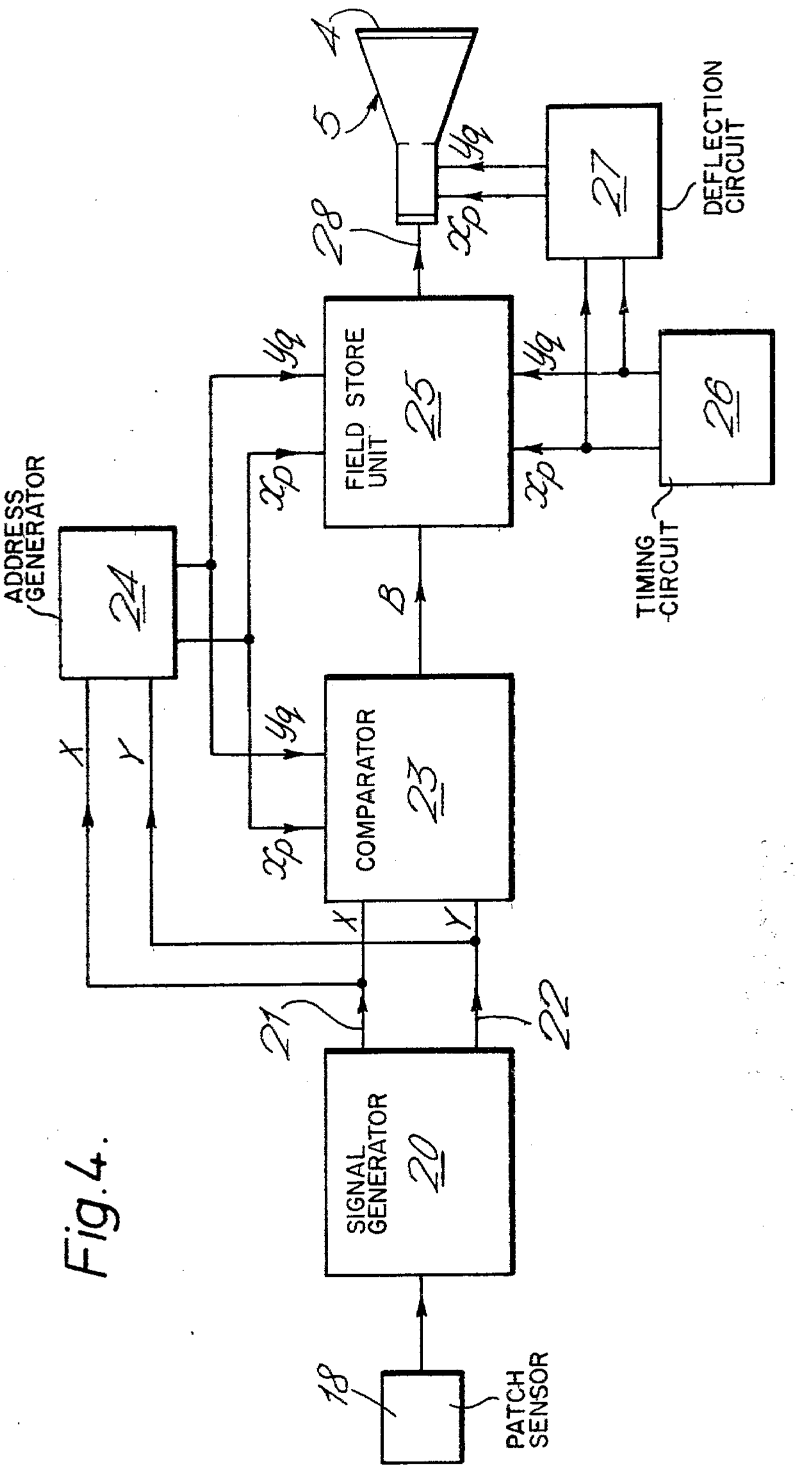
FIG. 4 is a schematic representation of electrical units used in the generation of video signals required in the provision of the display.

Referring now to FIG. 4, a set of signals representative of the points XY along the line 14 is produced by a signal generator 20, within the waveform generator 17, in response to signals from a pitch sensor 18. As the pitch of the aircraft, and hence the output of the sensor 18 varies, a new set of signals is produced by the signal generator 20 representative of a pitch bar at a different inclination.

The set of signals representing the points XY is supplied via lines 21 and 22 to a comparator 23 and to an address generator 24. The comparator 23 also receives at another input signals $x_p y_q$ of the address generator 24 which signals are also supplied to a field store unit 25. The field store unit 25, in effect, contains an array of storage locations, each of the points $x_p y_q$ in the display area 4 being associated with an individual one of these storage locations. The signals supplied to the field store unit 26 from the address generator 24 are operative to address one of its storage locations, the comparator 23 supplying signals to this storage location indicative of the brightness weighting B of the point $x_p y_q$ associated with that storage location.

The comparator 23 operates in the manner described below.

As mentioned earlier, the comparator 23 receives two sets of input signals: one set from the signal generator 20 indicative of the points XY, and another set from the address generator 24 indicative of the points $x_p y_q$. For each point $x_p y_q$, the comparator 23 calculates the proximity or distance d from each point XY of the symbol, such as, for example, according to the equations: /

$$d_{1pq}^2=(X_1-x_p)^2=(Y_1-y_q)^2 \text{ for the point } X_1Y_1 \quad (1)$$

$$d_{2pq}^2=(X_2-x_p)^2+(Y_2-y_q)^2 \text{ for the point } X_2Y_2 \quad (2)$$

$$d_{3pq}^2=(X_3-x_p)^2+(Y_3-y_q)^2 \text{ for the point } X_3Y_3 \quad (3)$$

and so on, or, in general:

$$d_{npq}^2=(X_n-x_p)^2+(Y_n-y_q)^2 \text{ for the point } X_nY_n \quad (4)$$

The comparator 23 then performs the comparison (5) below on each of the distances d to assess whether they are less than a, that is, to determine within which of the areas A the point $x_p y_q$ lies.

$$d \leqq a \quad (5)$$

For the point $x_1y_1$, only the distance $d_{111}$ from $X_1Y_1$ is less than a; as can be seen from FIG. 3, $x_1y_1$ lies in only the area $A_1$. For this point therefore a brightness weighting signal $B_{111}$ is supplied by the comparator 23 to the storage location associated with $x_1y_1$ in the field store unit 25 in dependence only upon the distance $d_{111}$ of $x_1y_1$ from $X_1Y_1$. The signal B may have a linear dependence on d, for example:

$$B=C(a-d) \quad (6)$$

where C is a constant.

Alternatively, B may depend on a power of d, for example:

$$B=C\,(a-d)^K \quad (7)$$

where K is a constant.

In general, the brightness weighting B will be a maximum when $x_p y_q$ coincides with one of the points defining the symbol to be displayed, that is, when d=0, and will be less for greater values of d until B=0 when d=a.

The point $x_2y_1$, however, lies within the area $A_1$ around point $X_1Y_1$ and also within the area $A_2$ around the point $X_2Y_2$. For this point $x_2y_1$, the comparator 23 calculates two brightness weighting signals $B_{121}$ and $B_{221}$ in accordance respectively with the distance $d_{121}$ from the point $X_1Y_1$ and the distance $d_{221}$ from the point $X_2Y_2$. The first of these brightness weighting signals $B_{121}$ is supplied by the comparator 23 to the storage location associated with the point $x_2y_1$ in the field store unit 25 and then the second brightness weighting signal $B_{221}$ is supplied to the same storage location to be added to $B_{121}$ so that the storage location thereby contains a representation of the overall brightness weighting signal D, where:

$$B=B_{121}=B_{221} \quad (8)$$

Thus, as the signal generator 20 supplies output signals representative of successive points XY of the symbol to be displayed, each location required to be bright within the unit 25 is filled with a representation of a brightness weighting signal. A large number of the storage locations will, however, remain empty since only a relatively small proportion of the display area will in general be occupied by symbology.

When the brightness weighting values have been written into the field store unit 25 these values are read out to provide bright-up of the cathode-ray tube screen 4. To effect read-out, the field store unit 25 is scanned in accordance with signals from a timing circuit 26 which also provides signals to a deflection circuit 27 controlling deflection of the beam of the cathode-ray tube 5 in a known manner. As the field store unit 25 is scanned, signals in accordance with the stored brightness weighting values B are supplied over line 28 to the grid electrode of the cathode-ray tube 5 so as to modulate the brightness of the beam during its scan over the screen 4. The rate at which the field store unit 25 is scanned during read-out will commonly be greater than the rate at which the brightness weighting values are written in.

In the arrangement of the present invention, where the symbol crosses the raster line at a small angle to the horizontal, the points $x_p$ along the raster line are brighted up to successively higher levels towards the center of the symbol. Examples of brightness weighting values, having a linear dependence on d, as set out in equation (5), for a portion of the horizontal raster line $y_2$ where the symbol crosses it are set out below:

| | $X_1$ | $X_2$ | $X_3$ | $X_4$ | $X_5$ | $X_6$ | $X_7$ | $X_8$ |
|---|---|---|---|---|---|---|---|---|
| B | 0.6 | 1.6 | 2.1 | 2.1 | 1.7 | 1.0 | 0.1 | 0 |

Figure 7:
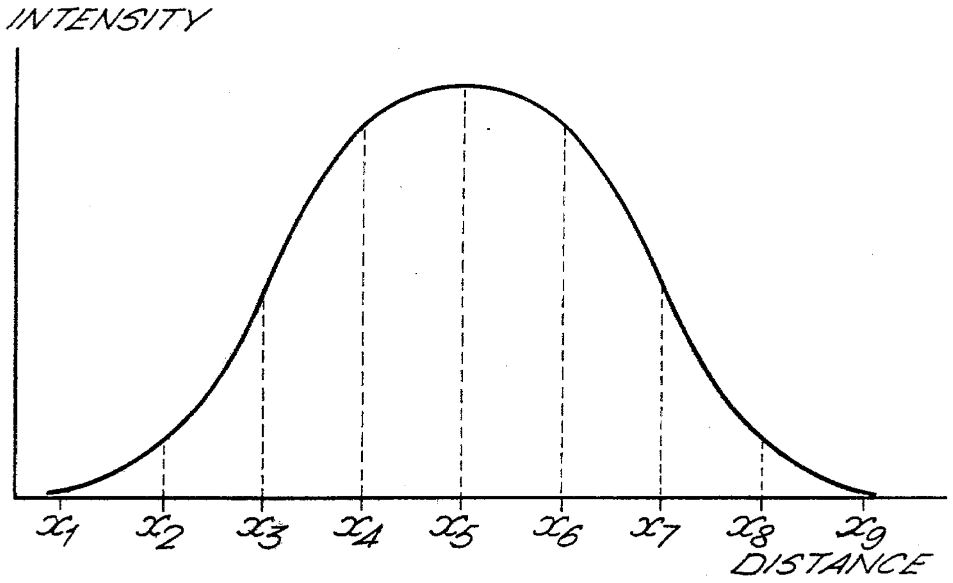
FIG. 7 is a graph illustrating a typical intensity profile curve along a raster line of the display area.

A general form of intensity profile along one of the raster lines is shown in FIG. 7.

Adjacent horizontal lines will be brighted up in a similar manner such that there is a gradual transition in brightness between raster lines and any stepped-effect is thereby significantly reduced.

In normal operation of a raster scanned cathode-ray-tube display, the display will consist of two interlaced frames of fields (that is, the odd field and even field). The arrangement described above, for simplicity, concerned the operation of any one of these fields. It will be necessary normally to provide a field store unit with sufficient storage locations to store representations of the brightness weightings associated with every point $x_p y_q$ in both the odd field and even field.

It will be appreciated that symbols other than straight lines can be displayed in the manner described above. The signal generator 20 can provide signals representative of points along curved lines or a circle (such as, for example, the circular flight-vector symbol 15 in FIG. 2) or it may provide signals representative of points along an alpha-numeric character.

One disadvantage of the above arrangement is that the field store unit 25 must have sufficient storage locations to store the brightness weighting signals associated with every point $x_p y_q$ of the display area. It can be expensive to provide a storage location for every point $x_p y_q$ in this manner and can lead to a field store unit of relatively large size and weight. Typically a display screen might have five hundred and twelve lines and be required to define the same number of points along each line. If the brightness weighting values were on a four-bit grey scale then the field store unit would require $512\times512\times4=1{,}126{,}400$ bits of storage capacity.

Figure 5:
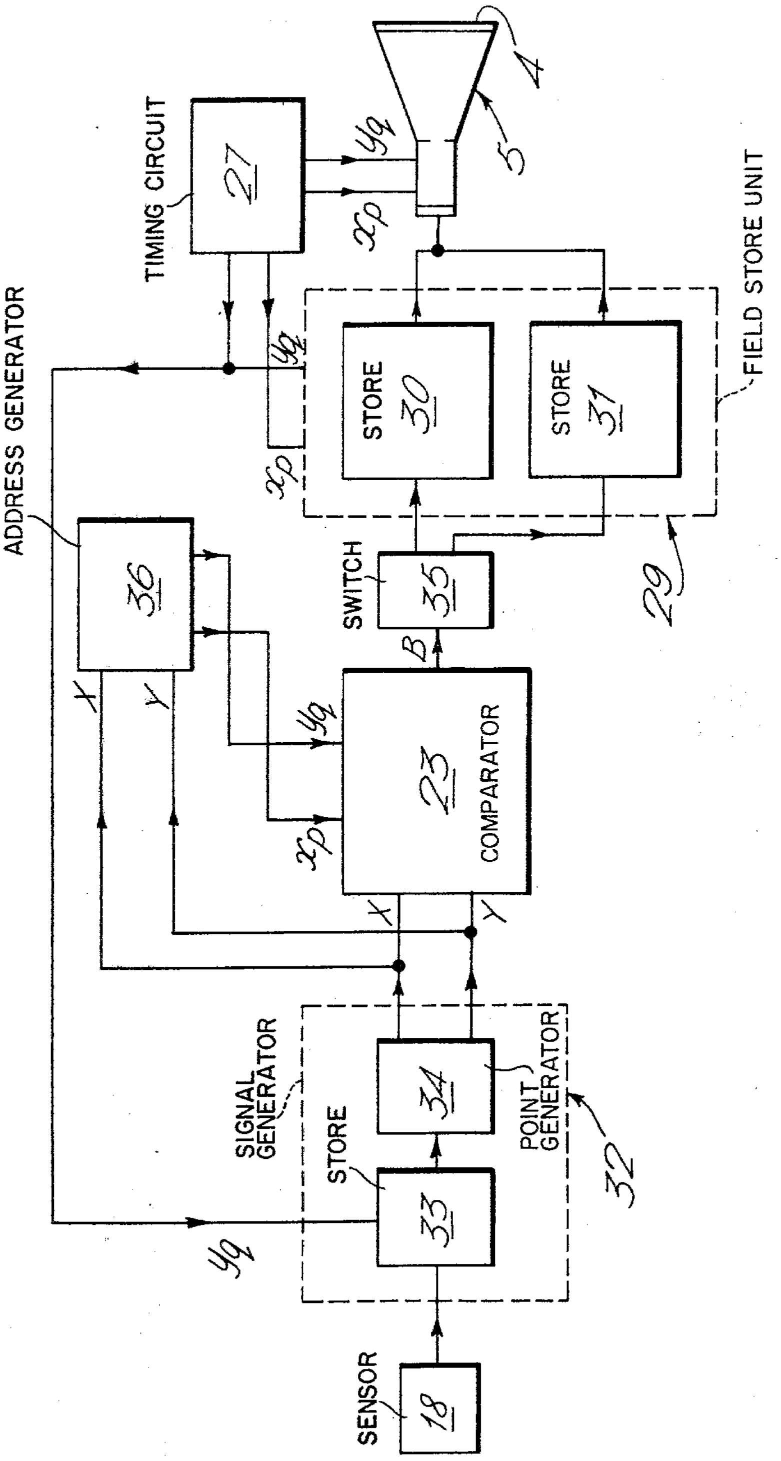
FIG. 5 is a schematic representation of electrical units whereby the required storage capacity of the display system can be reduced.

With reference to FIG. 5, there is shown an arrangement whereby the capacity of the field store unit can be reduced. Essentially, a field store unit 29 is split into two partial stores 30 and 31 each having typically about sixteen thousand storage locations, or bits, for storing signals representing the brightness weightings, on a four-bit grey scale, of the five hundred and twelve points $x_p$ along each of only eight horizontal raster lines. A signal generator 32 in this arrangement has a stored datum mapping of each symbol or image to be displayed, and separately of this datum mapping it generates signals representing the disposition of the symbol or image which might, for example, be its angular orientation, and its location in the display area (its location might, for example, be designated by signals representing the start of the symbol), these signals being derived in response to signals from the sensors 18. The datum mapping signals and the signals representing the disposition of the symbol are both stored in a storage unit 33 within the generator 32. A point generator unit 33 to provide a series of output signals from the generator 32 representing a series of points XY defining the representation of the particular symbol in the display area 4. Signals from the signal generator 32 are passed to the comparator 23 and from there are switched by a switching unit 35 to one or other of the partial stores 30 or 31.

In operation, at the beginning of the scan of the screen 4 the storage unit 33 is interrogated in response to signals from a timing circuit 27 to ascertain whether any of the symbols or images to be displayed lie within a first segment of the screen comprising the first eight horizontal raster lines. If any symbol or part of a symbol lies within this segment the storage unit 33 reads out the signals representing that symbol or part via the point generator 34 to the comparator 23 and to an address generator 36. The comparator 23 functions in the manner described earlier to produce brightness weightings signals B which are supplied via the switching unit 35 to the first partial store 30. Signals from the partial store 30 are read out at the scan rate of the cathode-ray tube 5 to cause appropriate brightness modulation of the beam during its scan of the first eight horizontal lines.

While the first segment is being displayed, the storage unit 33 is interrogated to ascertain whether any of the symbols or images lie within a second segment of the screen, that is, the next eight raster lines. Information concerning this second segment is routed by the unit 35 to be written in the second partial store 31.

When the cathode-ray tube beam has completed its scan of the first eight lines, signals are supplied to the cathode-ray tube 5 from the second partial store 31 in respect of the next eight lines. The switching unit 35 then passes signals in respect of the third segment for storage in the first partial store 30 and in this way the display area is gradually built up segment by segment.

Since it is only necessary to provide storage for sixteen lines (that is, two segments of eight lines each) at any one time there is a reduction in the overall storage that would be necessary if all five hundred and twelve lines were to be stored simultaneously.

Clearly, the segments need not necessarily comprise eight lines, the partial field stores could be capable of storing signals representative of the points $x_p$ along more or fewer lines.

Figure 6:
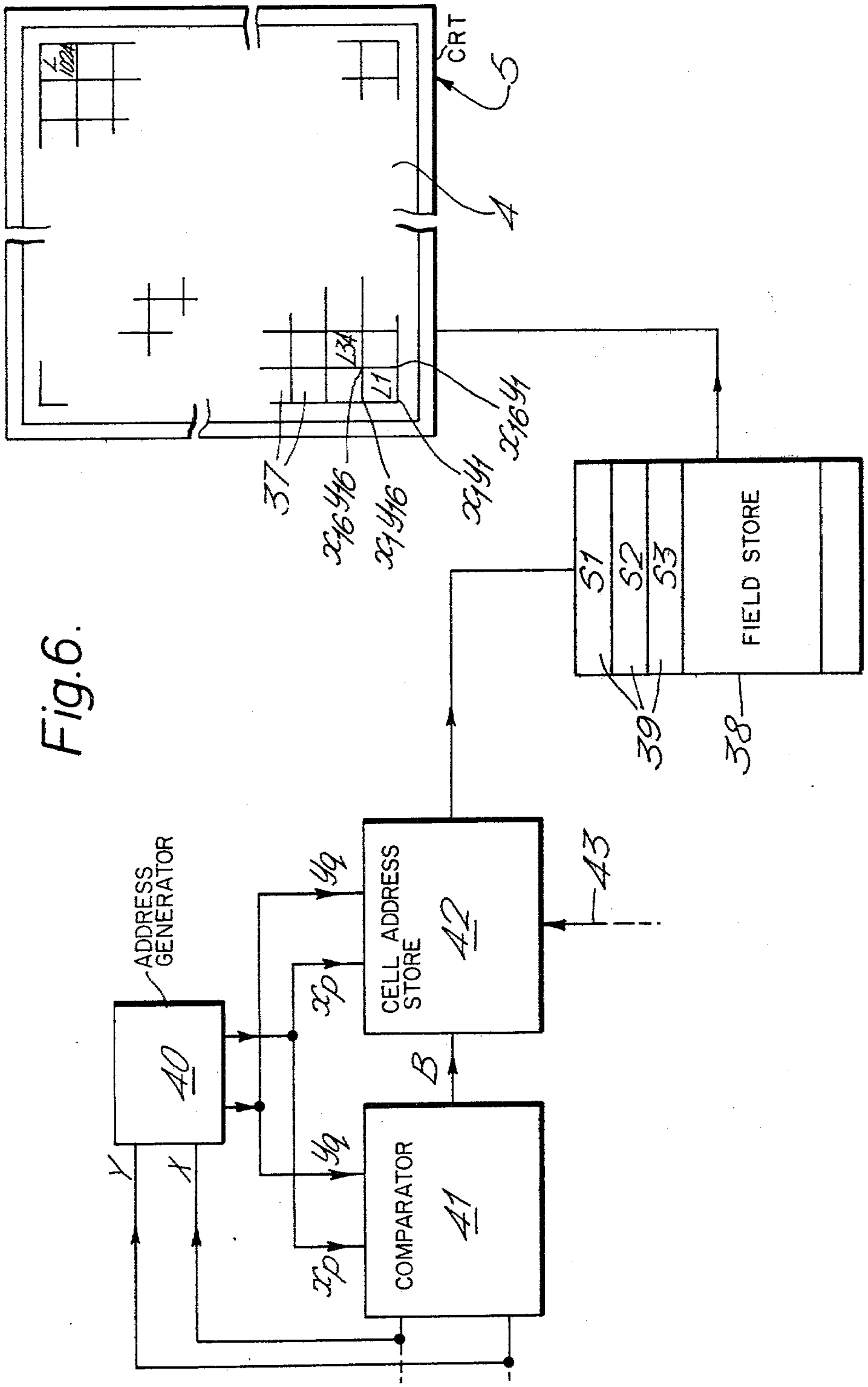
FIG. 6 shows an alternative arrangement wherein the required storage capacity can be reduced.

There are other arrangements envisaged by which the capacity of the field store can be reduced, such as, for example, is shown in FIG. 6. In this arrangement the screen 4 of the cathode-ray tube 5 is considered as being divided into an array of thirty two by thirty two cells 37 making one thousand and twenty four cells in all (L1 to L1024). Each cell 37 includes a number of the elementary points $x_py_q$ of the display area. If, for example, the display area has five hundred and twelve horizontal lines and the same number of points along each line then each cell 37 will contain sixteen by sixteen or two hundred and fifty six points. Those points within the square defined by the points $x_1y_1$, $x_{16}y_1$, $x_{16}y_{16}$ and $x_1y_{16}$, for example, will be in cell L1 at the bottom left-hand corner of the display screen 4.

A field store 38 is, in a similar way divided into separate units or blocks 39; the number of blocks 39 is less than the number of cells 37 in the display area 4. Each block 39 contains a sufficient number of individual storage locations to store the brightness weighting values B associated with each point $x_py_q$ within one of the cells 37. If, for example, the brightness weighting value is on a four-bit grey scale, the blocks 39 will each comprise two hundred and fifty six by four, that is, one thousand and twenty four bits.

Signals from an address generator 40 and a comparator 41 define respectively the points $x_py_q$ of a symbol or image and the brightness weighting B to be applied to the display screen 4 at that point. These signals are supplied to a cell address store 42 which identifies within which cell 37 of the display area each point $x_py_q$ lies and allocates that cell to one of the blocks 39 within the field store 38. For example, for the point $x_{18}y_{18}$ the cell address store 42 identifies that this point lies within cell L34 in the display area. The cell address store 42 then checks whether cell L34 has been allocated to one of the blocks 39 within the field store 38. If it has not, and if $x_{18}y_{18}$ is the first point for which bright-up is required, then the cell address store 42 labels the cell L34 with the first block S1 in the field store 38 and stores this label at a location within the store 42 whilst writing the brightness weighting value B into one of the locations within block S1 in the field store 38. Brightness weighting values B for other points $x_py_q$, for example, points $x_{19}y_{18}$ or $x_{20}y_{19}$, which also lie within cell L34 are similarly stored within block S1 at different locations.

When brightness weighting values occur for points $x_py_q$ outside cell L34 they will be labelled with the next block identity, that is, S2. It can be seen therefore that the blocks 39 within the field store 38 will only be written into upon occurrence of a brightness weighting value. Although not necessarily all the storage locations within each block 39 will contain stored brightness weighting values, none of at least the initial blocks will be entirely empty. In this way, the storage capacity wasted by association with points $x_py_q$ of the display area which are not occupied by symbology will be reduced. In general, only a small proportion of the display area is occupied with symbology at any one time; with a typical aircraft head-up display system, for example, it is possible to reduce the storage capacity required by about one eighth that which would be required if every point $x_py_q$ of the display area were to be associated with its own individual storage location within the field store.

Read-out from the field store 38 is effected in response to signals along line 43 from a timing circuit (not shown) associated with the deflection circuit of the cathode-ray tube 5. a particular storage location within a particular block in the field store 38 is addressed by those signals via the cell address store 42, signals from the field store being supplied to the grid electrode of the cathode-ray tube 5 in the usual manner.

A further way in which the storage capacity of the field store can be reduced is outlined below.

As has been shown earlier, the intensity profile along one of the horizontal raster lines $y_q$ of the display screen is given by a curve of the form shown in FIG. 7. The shape of this curve will of course vary according to the disposition of the symbol or image displayed in respect of the raster line. For example, where the symbol is in the form of a straight line perpendicular to the raster line the cut-off to either side of the center of the curve will be relatively sharp. On the other hand, if the symbol is in the form of a straight line inclined at a small angle to the raster line then the curve will be relatively stretched-out along the raster line, with the intensity falling more gradually to zero on either side of the center. The curve is, however, of the same general configuration for most symbology. Instead of having a storage location associated with each of the points $x_p$ along each raster line (which would, for example, require five hundred and twelve storage locations for every brightness weighting value along each line) it is possible to halve the storage capacity required by having a storage location associated with only every other point (for example, $x_1$, $x_3$, $x_5$, $x_7$, $x_9$ etc.). The brightness weighting values B for the intermediate points ($x_2$, $x_4$, $x_6$, $x_8$ etc.) can be interpolated from a knowledge of the general shape of the intensity profile curve.

Figure 8:
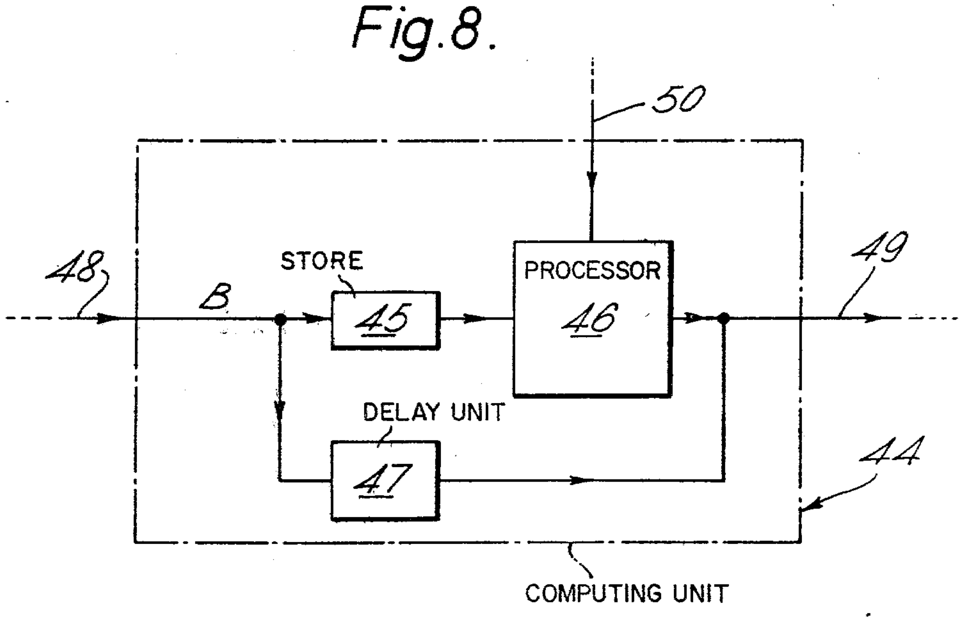
FIG. 8 shows a further arrangement whereby the required storage capacity can be reduced.

A computing unit 44, of the form shown in FIG. 8 may be included in the display apparatus between the output from the field store 25, 29 or 38 and the grid input to the cathode-ray tube 5. The computing unit 44 includes a storage unit 45, a processor 46 and a delay unit 47. Brightness weighting signals B (in respect of, for example, odd numbered points $x_1$, $x_3$, $x_5$, $x_7$, $x_9$ etc.) from a field store unit are supplied along line 48 to the storage unit 45 and to the output line 49 via the delay unit 47. The processor 46 is triggered by signals along line 50 from a timing circuit (not shown) controlling the deflection circuit of the cathode-ray tube 5 to interpolate a brightness weighting value B indicative of the brightness weighting value of points along a raster line intermediate those points provided by the field store unit (for example, the points $x_2$, $x_4$, $x_6$, $x_8$ etc.). Signals representing these interpolated values are supplied directly to the output line 49, the delay provided by the unit 47 being such that the interpolated signals from the processor 46 will be output intermediate those from the field store. Interpolation of the intermediate brightness weighting values may be carried out by any of the suitable known methods, such as, by deriving an arithmetic mean of the values.

Storage in any of the above arrangements may be provided by, for example, shift registers, read-only memories, random-access memories or any other suitable well-known means.

The display need not necessarily be provided by a cathode-ray tube in the manner described above but could instead be provided by, for example, a matrix array of electrically-energizable elements such as light-emitting diodes. The terms 'bright up' and 'brightness' used above are intended to apply to energisation of light-reflecting or light-absorbing elements as well as light-emitting elements.

I claim:

1. A control system for selectively controlling bright-up of elements of a display area during raster scanning of said area such as to provide a display representation of an image, said control system comprising:

(a) first signal generating means for generating first signals representative of the coordinates of a series of points defining said image;
(b) second signal generating means for generating second signals representative of the coordinates of said elements addressed during said raster scan;
(c) comparator means;
(d) means for supplying said first and second signals to said comparator means, the said comparator means being operative to derive from the difference between said first and second signals third signals representative of the proximity of said elements to said points including points not located along the raster line of said elements addressed during scanning of said line;
(e) control means; and
(f) means for supplying said third signals to said control means, the said control means being arranged to control the degree of bright-up applied to said elements in accordance with said third signals.

2. A control system according to claim 1, wherein said third signals are representative of the proximity of some at least of said elements to more than one of said points.

3. A control system according to claim 1, wherein said control means controls the said degree of bright-up applied to said elements in accordance with third signals representative of the proximity of said elements to only those of said points within a predetermined proximity.

4. A control system according to claim 3, wherein said predetermined proximity is substantially equal to the proximity of said points defining said image to adjacent ones of said points defining said image.

5. A control system according to claim 3, wherein said third signals derived by said comparator means are individual brightness-weighting signals in respect of the proximity of each of said elements to each of said points within said predetermined proximity, and wherein said control means includes store means having storage locations associated with individual ones of said elements, and means for supplying said brightness-weighting signals in respect of said indications of proximity of each said element to a respective one of said storage locations, the store means providing a total of said individual brightness-weighting signals for each said element.

6. A control system according to claim 1, wherein said third signals have a linear dependence on said proximity.

7. A control system according to claim 1, wherein said third signals have a non-linear dependence on said proximity.

8. A control system according to claim 5, wherein said store means includes a plurality of store units, each said store unit including a plurality of said storage locations, said control system further including supply means for suppling brightness-weighting signals from said comparator means in respect of elements within a plurality of regions of said display area in succession to respective individual ones of said store units, the number of store units being less than the number of said regions, and said control means being operative to read out signals from said store units in succession such that, following read out from one of said store units, said supply means supplies signals in respect of a different one of said regions to said one store unit.

9. A control system according to claim 8, wherein said regions comprise the length of a plurality of raster lines of said display area.

10. A control system according to claim 5, wherein said store means includes a plurality of store units, each said store unit including a plurality of said storage locations, said control system further including supply means for supplying brightness-weighting signals in respect of elements within individual regions of said display area in succession to individual ones of said store units only if brightness-weighting signals in respect of elements within said individual regions are such as to indicate the presence of a part at least of said image in said region, the number of said store units less than the number of said regions.

11. A control system according to any one of claims 1 to 10 including delay means, processing means, and means for supplying both to said delay means and to said processing means first bright-up signals representative of the degree of bright-up to be applied to first elements along raster lines of said display area, said processing means including means for interpolating from said first bright-up signals second bright-up signals representative of the degree of bright-up to be applied to second elements intermediate said first elements, the delay provided by said delay means being such that said second bright-up signals are output intermediate said first bright-up signals.

12. A display system including a control system according to any one of claims 1 to 10 and a display area provided by the screen of a cathode-ray tube.

13. A display system in which bright-up of elements of a display area are controlled during raster scanning of said area such as to provide a display representation of an image, said display system including a display area and a control system comprising:

(a) first signal generating means for generating first signals representative of the coordinates of a series of points defining said image;

(b) second signal generating means for generating second signals representative of the coordinates of said elements addressed during said raster scan;

(c) comparator means;

(d) means for supplying said first and second signals to said comparator means, the said comparator means being operative to derive brightness-weighting signals in respect of said elements in accordance with the proximity of said elements to each of those of said points within a predetermined proximity including those points within said predetermined proximity not located along the raster line of said elements addressed during scanning of that line;

(e) store means including a plurality of individual storage locations;

(f) means for supplying said brightness-weighting signals in respect of each said element to an individual one of said storage locations, each said storage location thereby containing a representation of the total of said brightness-weighted signals in respect of an individual one of said elements; and (g) means for supplying signals to control bright-up of each said element in accordance with each said representation.

14. A method of controlling the degree of bright-up of elements of a display area during raster scanning of said area such as to provide a display representation of an image in said area, comprising the steps of:

(a) deriving first signals representative of coordinates of a series of points defining said image;

(b) deriving second signals representative of coordinates of said elements addressed during said raster scan;

(c) deriving from the difference between said first and second signals an indication of the proximity of said elements to said points including points not located along the raster line of said elements addressed during scanning of that line; and (d) controlling the degree of bright-up applied to said elements in accordance with said indication.

15. A method according to claim 14 wherein the said degree of bright-up applied to each element is controlled in accordance with the proximity of said element to only those of said points within a predetermined proximity.

* * * * *